(12) United States Patent
Templeton et al.

(10) Patent No.: US 10,614,450 B1
(45) Date of Patent: Apr. 7, 2020

(54) CONTROLLED EMULATION OF PAYMENT CARDS

(71) Applicant: Square, Inc., San Francisco, CA (US)

(72) Inventors: Thomas Templeton, San Francisco, CA (US); Alexey Kalinichenko, San Francisco, CA (US); Andrew Borovsky, New York, NY (US); Paul Aaron, San Francisco, CA (US); Jesse L. Dorogusker, Palo Alto, CA (US)

(73) Assignee: Squre, Inc., San Francisco ( * ) Notice: Subject to any disclaimer, the term of this patent is extended or adjusted under 35 U.S.C. 154(b) by 1376 days.

(21) Appl. No.: 14/455,287

(22) Filed: Aug. 8, 2014

(51) Int. Cl.
*G06Q 20/00* (2012.01)
*G06Q 20/34* (2012.01)
*G06Q 20/10* (2012.01)
*G06Q 20/20* (2012.01)

(52) U.S. Cl.
CPC ....... *G06Q 20/3572* (2013.01); *G06Q 20/105* (2013.01); *G06Q 20/204* (2013.01); *G06Q 20/351* (2013.01)

(58) Field of Classification Search
CPC .............................. G06Q 30/06; G06K 19/06
USPC ...................................... 705/16, 41; 235/492
See application file for complete search history.

(56) References Cited

U.S. PATENT DOCUMENTS

| | | |
|---|---|---|
| 5,590,038 A | 12/1996 | Pitroda |
| 6,427,911 B1 | 8/2002 | Barnes et al. |
| 8,280,793 B1 | 10/2012 | Kempkes et al. |
| 8,317,103 B1 | 11/2012 | Foo et al. |
| 8,577,731 B1 | 11/2013 | Cope et al. |
| 8,579,203 B1 | 11/2013 | Lambeth et al. |
| 8,590,796 B1 | 11/2013 | Cloutier et al. |
| 8,622,309 B1 * | 1/2014 | Mullen ................ G06Q 20/347 235/492 |
| 8,712,854 B1 | 4/2014 | Rafferty et al. |
| 8,788,418 B2 | 7/2014 | Spodak et al. |
| 8,939,357 B1 | 1/2015 | Perry |
| 8,972,298 B2 | 3/2015 | Kunz et al. |
| 9,010,644 B1 | 4/2015 | Workley |
| 9,092,767 B1 | 7/2015 | Andrews et al. |
| 9,135,545 B1 | 9/2015 | Lamba |
| 9,183,480 B1 | 11/2015 | Quigley et al. |

(Continued)

FOREIGN PATENT DOCUMENTS

| | | |
|---|---|---|
| JP | H05333966 A | 12/1993 |
| WO | 2015/061005 A1 | 4/2015 |
| WO | 2016/003831 A1 | 1/2016 |

OTHER PUBLICATIONS

Non-Final Office Action dated Aug. 23, 2017, for U.S. Appl. No. 14/455,225, of Templeton, T., et al., filed Aug. 8, 2014.

(Continued)

*Primary Examiner* — Oluseye Iwarere
(74) *Attorney, Agent, or Firm* — Schott, P.C.

(57) ABSTRACT

A technique for a proxy card to emulate each of a plurality of payment cards according to emulation rules associated with the payment card. The proxy card initially selects one of the plurality of payment cards for emulation based on one or more selection rules or a user instruction. Next, the proxy card emulates the selected payment card according to one or more emulation rule associated with the selected payment card, each relating to how emulation is performed with respect to time, location, business, or other factors.

7 Claims, 6 Drawing Sheets

(56) References Cited

U.S. PATENT DOCUMENTS

| | | | |
|---|---|---|---|
| 9,224,141 B1 | 12/2015 | Lamba et al. | |
| 9,311,585 B1* | 4/2016 | Steshenko | G06K 19/06206 |
| 9,619,792 B1 | 4/2017 | Aaron et al. | |
| 9,679,234 B2 | 6/2017 | Wade | |
| 9,922,321 B2 | 3/2018 | Aaron et al. | |
| 10,037,526 B2* | 7/2018 | Campos | G06Q 20/3674 |
| 2003/0019942 A1 | 1/2003 | Blossom | |
| 2003/0061157 A1 | 3/2003 | Hirka et al. | |
| 2003/0065805 A1 | 4/2003 | Barnes, Jr. | |
| 2004/0138999 A1 | 7/2004 | Friedman et al. | |
| 2004/0158728 A1 | 8/2004 | Kim | |
| 2005/0247785 A1 | 11/2005 | Bertin | |
| 2006/0032906 A1 | 2/2006 | Sines | |
| 2006/0077895 A1* | 4/2006 | Wright | H04L 29/12358 370/235 |
| 2006/0206488 A1 | 9/2006 | Distasio | |
| 2008/0078831 A1 | 4/2008 | Johnson et al. | |
| 2008/0177826 A1 | 7/2008 | Pitroda | |
| 2008/0197201 A1 | 8/2008 | Manessis et al. | |
| 2008/0222047 A1 | 9/2008 | Boalt | |
| 2009/0043702 A1 | 2/2009 | Bennett | |
| 2009/0063312 A1 | 3/2009 | Hurst | |
| 2009/0159663 A1 | 6/2009 | Mullen et al. | |
| 2009/0159667 A1* | 6/2009 | Mullen | G06K 19/06206 235/380 |
| 2009/0159671 A1* | 6/2009 | Mullen | G06K 19/06206 235/380 |
| 2009/0159672 A1* | 6/2009 | Mullen | G06K 19/06206 235/380 |
| 2009/0192904 A1 | 7/2009 | Patterson et al. | |
| 2010/0063906 A1* | 3/2010 | Nelsen | G06Q 20/28 705/30 |
| 2010/0102125 A1 | 4/2010 | Gatto | |
| 2010/0218009 A1 | 8/2010 | Hoeksel et al. | |
| 2011/0131128 A1 | 6/2011 | Vaananen | |
| 2011/0174874 A1 | 7/2011 | Poznansky et al. | |
| 2011/0180598 A1 | 7/2011 | Morgan et al. | |
| 2011/0231270 A1 | 9/2011 | Dykes et al. | |
| 2011/0238510 A1 | 9/2011 | Rowen et al. | |
| 2011/0240748 A1* | 10/2011 | Doughty | G06Q 20/327 235/492 |
| 2011/0270747 A1 | 11/2011 | Xu | |
| 2011/0295750 A1 | 12/2011 | Rammal | |
| 2011/0313840 A1 | 12/2011 | Mason et al. | |
| 2012/0059718 A1 | 3/2012 | Ramer et al. | |
| 2012/0123935 A1* | 5/2012 | Brudnicki | G06Q 20/20 705/41 |
| 2012/0310760 A1 | 12/2012 | Phillips et al. | |
| 2013/0024364 A1 | 1/2013 | Shrivastava et al. | |
| 2013/0024371 A1 | 1/2013 | Hariramani et al. | |
| 2013/0030997 A1 | 1/2013 | Spodak et al. | |
| 2013/0036048 A1* | 2/2013 | Campos | G06Q 20/36 705/41 |
| 2013/0048719 A1 | 2/2013 | Bennett | |
| 2013/0117155 A1 | 5/2013 | Glasgo | |
| 2013/0134216 A1 | 5/2013 | Spodak et al. | |
| 2013/0134962 A1 | 5/2013 | Kamel et al. | |
| 2013/0204777 A1 | 8/2013 | Irwin, Jr. et al. | |
| 2013/0204793 A1 | 8/2013 | Kerridge et al. | |
| 2013/0228616 A1 | 9/2013 | Bhosle et al. | |
| 2013/0246218 A1 | 9/2013 | Gopalan | |
| 2013/0248591 A1 | 9/2013 | Look et al. | |
| 2013/0254227 A1 | 9/2013 | Shim et al. | |
| 2013/0256403 A1 | 10/2013 | MacKinnon | |
| 2013/0284806 A1 | 10/2013 | Margalit | |
| 2013/0339166 A1* | 12/2013 | Baer | G06Q 20/227 705/16 |
| 2014/0074655 A1 | 3/2014 | Lim et al. | |
| 2014/0074716 A1 | 3/2014 | Ni | |
| 2014/0084059 A1 | 3/2014 | Sierchio et al. | |
| 2014/0101035 A1 | 4/2014 | Tanner et al. | |
| 2014/0149282 A1 | 5/2014 | Philliou et al. | |
| 2014/0159869 A1 | 6/2014 | Zumsteg et al. | |
| 2014/0214567 A1 | 7/2014 | Llach et al. | |
| 2014/0217174 A1* | 8/2014 | Lo | G06K 7/084 235/437 |
| 2015/0058146 A1 | 2/2015 | Gaddam et al. | |
| 2015/0058940 A1* | 2/2015 | Robison | H04L 63/08 726/6 |
| 2015/0069126 A1* | 3/2015 | Leon | G06K 19/06206 235/449 |
| 2015/0073983 A1* | 3/2015 | Bartenstein | G06Q 20/3415 705/41 |
| 2015/0127553 A1 | 5/2015 | Sundaram et al. | |
| 2015/0134513 A1 | 5/2015 | Olson et al. | |
| 2015/0186871 A1* | 7/2015 | Laracey | G06Q 20/3278 705/41 |
| 2015/0205550 A1* | 7/2015 | Lee | H04W 76/15 358/1.15 |
| 2016/0086166 A1 | 3/2016 | Pomeroy et al. | |

OTHER PUBLICATIONS

Final Office Action dated Sep. 29, 2017, for U.S. Appl. No. 14/455,220, of Templeton, T., et al., filed Aug. 8, 2014.
U.S. Appl. No. 14/168,274 of Odawa, A. et al., filed Jan. 30, 2014.
U.S. Appl. No. 14/455,220 of Templeton, T. et al., filed Aug. 8, 2014.
U.S. Appl. No. 14/455,225 of Templeton, T. et al., filed Aug. 8, 2014.
Non-Final Office Action dated Jan. 20, 2017, for U.S. Appl. No. 14/168,274, of Odawa, A.W., et al., filed Jan. 30, 2014.
Non-Final Office Action dated Apr. 27, 2017, for U.S. Appl. No. 14/455,220, of Templeton, T., et al., filed Aug. 8, 2014.
Final Office Action dated May 19, 2017, for U.S. Appl. No. 14/168,274, of Odawa, A.W., et al., filed Jan. 30, 2014.
"Bluetooth Accessory Design Guidelines for Apple Products," Apple Inc., dated Sep. 18, 2013, Retrieved from the Internet URL: https://developer.apple.com/hardwaredrivers/BluetoothDesignGuidelines.pdf, pp. 1-40.
Chiraag, "A payment Card that Changes Magnetic Stripe via Smartphone," published Nov. 12, 2013, Retrieved from the Internet URL: https://letstalkpayments.com/card-changes-magnetic-stripe-via-smartphone/, on Jan. 3, 2018, pp. 1-6.
Non-Final Office Action dated Jan. 9, 2015, for U.S. Appl. No. 14/145,895 of Aaron, P., et al., filed Dec. 31, 2013.
Non-Final Office Action dated Feb. 6, 2015, for U.S. Appl. No. 14/478,522, of Lamba, K., filed Sep. 5, 2014.
Non-Final Office Action dated Feb. 18, 2015, for U.S. Appl. No. 14/244,632, of Quigley, O.S.C., et al., filed Apr. 3, 2014.
Non-Final Office Action dated May 12, 2015, for U.S. Appl. No. 14/189,869 of Lamba, K., et al., filed Feb. 25, 2014.
Non-Final Office Action dated May 26, 2015, for U.S. Appl. No. 14/225,338, of Aaron, P., et al., filed Mar. 25, 2014.
Non-Final Office Action dated May 27, 2015, for U.S. Appl. No. 14/197,704, of Lamba, K., et al., filed Mar. 5, 2014.
Notice of Allowance dated Jun. 3, 2015, for U.S. Appl. No. 14/478,522, of Lamba, K., filed Sep. 5, 2014.
Notice of Allowance dated Jul. 6, 2015, for U.S. Appl. No. 14/244,632, of Quigley, O.S.C., et al., filed Apr. 3, 2014.
Final Office Action dated Aug. 18, 2015, for U.S. Appl. No. 14/145,895, of Aaron, P., et al., filed Dec. 31, 2013.
Notice of Allowance dated Sep. 3, 2015, for U.S. Appl. No. 14/244,632, of Quigley, O.S.C., et al., filed Apr. 3, 2014.
Notice of Allowance dated Sep. 18, 2015, for U.S. Appl. No. 14/197,704, of Lamba, K., et al., filed Mar. 5, 2014.
Non-Final Office Action dated Sep. 23, 2015, for U.S. Appl. No. 14/478,601, of Steshenko, R.T.S. V., filed Sep. 5, 2014.
Final Office Action dated Oct. 2, 2015, for U.S. Appl. No. 14/225,338, of Aaron, P., et al., filed Mar. 25, 2014.
Advisory Action dated Dec. 31, 2015, for U.S. Appl. No. 14/225,338, of Aaron, P., et al., filed Mar. 25, 2014.
Non-Final Office Action dated Jan. 22, 2016, for U.S. Appl. No. 14/189,869, of Lamba, K., et al., filed Feb. 25, 2014.
Notice of Allowance dated Feb. 8, 2016, for U.S. Appl. No. 14/478,601, of Steshenko, R.T.S.V., filed Sep. 5, 2014.

(56) References Cited

OTHER PUBLICATIONS

Non-Final Office Action dated Mar. 24, 2016, for U.S. Appl. No. 14/145,895, of Aaron, P., et al., filed Dec. 31, 2013.
Non-Final Office Action dated May 9, 2016, for U.S. Appl. No. 14/225,338, of Aaron, P., et al., filed Mar. 25, 2014.
Final Office Action dated Jul. 18, 2016, for U.S. Appl. No. 14/189,869, of Lamba, K., et al., filed Feb. 25, 2014.
Non-Final Office Action dated Aug. 4, 2016, for U.S. Appl. No. 14/321,429, of Wade, J., filed Jul. 1, 2014.
Final Office Action dated Sep. 1, 2016, for U.S. Appl. No. 14/225,338, of Aaron, P., et al., filed Mar. 25, 2014.
Advisory Action dated Oct. 11, 2016, for U.S. Appl. No. 14/189,869, of Lamba, K., et al., filed Feb. 25, 2014.
Final Office Action dated Oct. 12, 2016, for U.S. Appl. No. 14/145,895, of Aaron, P., et al., filed Dec. 31, 2013.
Non-Final Office Action dated Nov. 3, 2016, for U.S. Appl. No. 14/225,342, of Lamba, K., et al., filed Mar. 25, 2014.
Notice of Allowance dated Nov. 8, 2016, for U.S. Appl. No. 14/225,338, of Aaron, P., et al., filed Mar. 25, 2014.
Advisory Action dated Dec. 22, 2016, for U.S. Appl. No. 14/145,895, of Aaron, P., et al., filed Dec. 31, 2013.
Notice of Allowance dated Feb. 7, 2017, for U.S. Appl. No. 14/321,429, of Wade, J., filed Jul. 1, 2014.
Final Office Action dated Mar. 10, 2017, for U.S. Appl. No. 14/225,342, of Lamba, K., et al., filed Mar. 25, 2014.
Non-Final Office Action dated Mar. 13, 2017, for U.S. Appl. No. 14/189,869, of Lamba, K., et al., filed Feb. 25, 2014.
Non-Final Office Action dated Apr. 12, 2017, for U.S. Appl. No. 14/145,895, of Aaron, P., et al., filed Dec. 31, 2013.
Advisory Action dated Jun. 9, 2017, for U.S. Appl. No. 14/225,342, of Lamba, K., et al., filed Mar. 25, 2014.
Non-Final Office Action dated Jun. 29, 2017, for U.S. Appl. No. 14/189,869, of Lamba, K., et al., filed Feb. 25, 2014.
Notice of Allowance dated Nov. 9, 2017, for U.S. Appl. No. 14/145,895, of Aaron, P., et al., filed Dec. 31, 2013.
Advisory Action dated Dec. 11, 2017, for U.S. Appl. No. 14/455,220, of Templeton, T., et al., filed Aug. 8, 2014.
Final Office Action dated Jan. 8, 2018, for U.S. Appl. No. 14/189,869, of Lamba, K., et al.al., filed Feb. 25, 2014.
Office Action for European Patent Application No. 14855987.5, dated Mar. 23, 2018.
Advisory Action dated Apr. 12, 2018, for U.S. Appl. No. 14/189,869, of Lamba, K., et al., filed Feb. 25, 2014.
Final Office Action dated May 2, 2018, for U.S. Appl. No. 14/455,225, of Templeton, T., et al., filed Aug. 8, 2014.
International Search Report and Written Opinion for International Application No. PCT/US2014/058447, dated Jan. 15, 2015.
International Search Report and Written Opinion for International Application No. PCT/US2015/038165, dated Sep. 17, 2015.
Extended European Search Report for European Patent Application No. 14855987.5, dated May 10, 2017.
Non-Final Office Action dated Oct. 5, 2018, for U.S. Appl. No. 14/189,869, of Lamba, K., et al., filed Feb. 25, 2014.
Advisory Action dated Jul. 25, 2018, for U.S. Appl. No. 14/455,225, of Templeton, T., et al., filed Aug. 8, 2014.
Office Action for European Patent Application No. 14855987.5, dated Sep. 14, 2018.
Notice of Allowance dated Dec. 27, 2018, for U.S. Appl. No. 14/455,225, of Templeton T., et al., filed Aug. 8, 2014.
Notice of Allowance dated Jan. 7, 2019, for U.S. Appl. No. 14/455,220, of Templeton, T., et al., filed Aug. 8, 2014.
Final Office Action dated Feb. 25, 2019, for U.S. Appl. No. 14/189,869, of Lamba, K., et al., filed Feb. 25, 2014.
Advisory Action dated May 7, 2019, for U.S. Appl. No. 14/189,869, of Lamba, K., et al., filed Feb. 25, 2014.
Non-Final Action dated May 30, 2019, for U.S. Appl. No. 15/436,478, of Kartik Lamba filed Feb. 17, 2017.

* cited by examiner

FIG. 1A

| USER INDEX: 1 | USER NAME: John Doe |
|---|---|

SELECTION

1. Use a store gift card when available.
2. During 8am – 5pm, use Card 1 by default.
3. During 5pm – 8am, use Card 0 by default.

EMULATION

| Card Index | Card Name | Time | Location | Business |
|---|---|---|---|---|
| 0 | Blank Card | | | |
| 1 | Master | On until 5 seconds after swipe | Near consumer's mobile device | |
| 2 | American Express | On from push of button for 20 seconds | Beauty and Fashion | Excellent credit history |
| 3 | WalMart | | WalMart | |

CONTROLLED EMULATION OF PAYMENT CARDS

BACKGROUND

A consumer today may use several types of payment cards, such as a credit card, a gift card, and an ATM card. Different types of payment cards may be well suited for different occasions. For example, a consumer would want to use an ATM card when no credit is accepted or use a gift card from a merchant in a business location of the merchant. It can be inconvenient and unwieldy to manage a number of payment cards. In addition, the use of each payment card often needs to be specifically controlled. For example, a consumer would want to deactivate a payment card when it is stolen, and a parent may want to limit the use of a payment card given to a child.

BRIEF DESCRIPTION OF THE DRAWINGS

Embodiments of the present invention will be described and explained through the use of the accompanying drawings in which.

DETAILED DESCRIPTION

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Introduced here is a technique related to a proxy card which emulates different payment cards according to different rules. Using this technique, a consumer benefits from the use of multiple payment cards with the single proxy card. Furthermore, the consumer can manage the selection of a payment card for emulation and the emulation of each selected payment card with various rules based on time, location, business, or other factor(s). Specifically, the consumer can create, edit or delete the various rules for each payment card using an electronic device, such as a mobile phone, which transmits the resulting rules to the proxy card at various points in time.

In certain embodiments a "proxy card" is a card that can emulate one or more other cards/accounts (e.g., payment cards/accounts). The proxy card is essentially identical or similar in appearance to a payment card, such as a credit card, a debit card, or a gift card, being roughly of wallet size and having an identification component, such as a magnetic stripe or integrated circuit (IC) chip, which can hold information identifying one or more payment cards. In addition, in some embodiments the proxy card includes a processor and memory capable of computation, processing and storage functionalities. The proxy card may also include input and output elements, such as a button or switch for input and a liquid-crystal display (LCD) or light emitting diode (LED) display for output. Furthermore, the proxy card includes a communication interface to carry out short-range (typically less than 100 meters) wireless communication, which may be implemented by Bluetooth Low Energy (BLE), for example. These features enable the proxy card to emulate each of multiple payment cards according to specified rules.

In some embodiments, the proxy card stores in the memory one or more rules governing the emulation of each payment card. It also stores in the memory identification information for each payment card. Upon accepting a selection of one of the multiple payment cards, through the input element or the communication interface, the processor configures the identification component to correspond to the selected payment card in accordance with emulation rules associated with the payment card. The proxy card also displays any status update or error message through the output element.

Figure 1A:
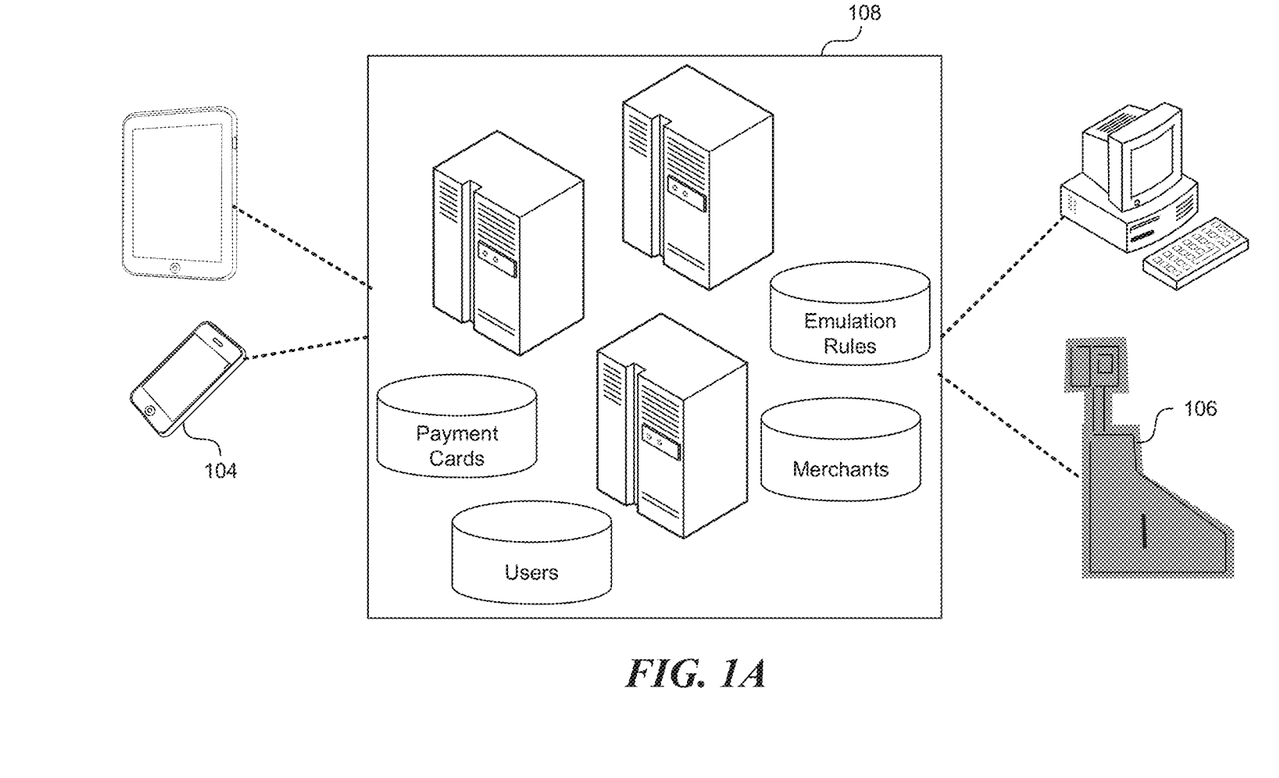
FIG. 1A illustrates an example environment in which a consumer sets up a proxy card profile using an electronic device.

FIG. 1A illustrates an example environment in which a consumer sets up a proxy card profile by using an electronic device. In some embodiments, before using a proxy card, the consumer needs to register one or more payment cards to be emulated by the proxy card and sets up a profile for the proxy card on a server system 108. One way to register each of the payment cards is through an electronic sensing device, such as a Radio-Frequency Identification (RFID) scanner or a Near Field Communication (NFC) scanner, attached to an electronic device, such as a mobile phone 104, which is capable of communicating with the server system 108. The communication between the electronic sensing device and the proxy card can be through a short-range wireless link, such as standard Bluetooth, BLE, Wi-Fi, RFID, and NFC, or direct access to the identification component on the proxy card. The communication between the electronic device and the server system 108 can be through any network link, such as the Internet. During registration, the electronic sensing device receives information from each payment card, and the electronic device forwards the received information to the server system 108, which then saves the forwarded information in databases.

Figure 1B:
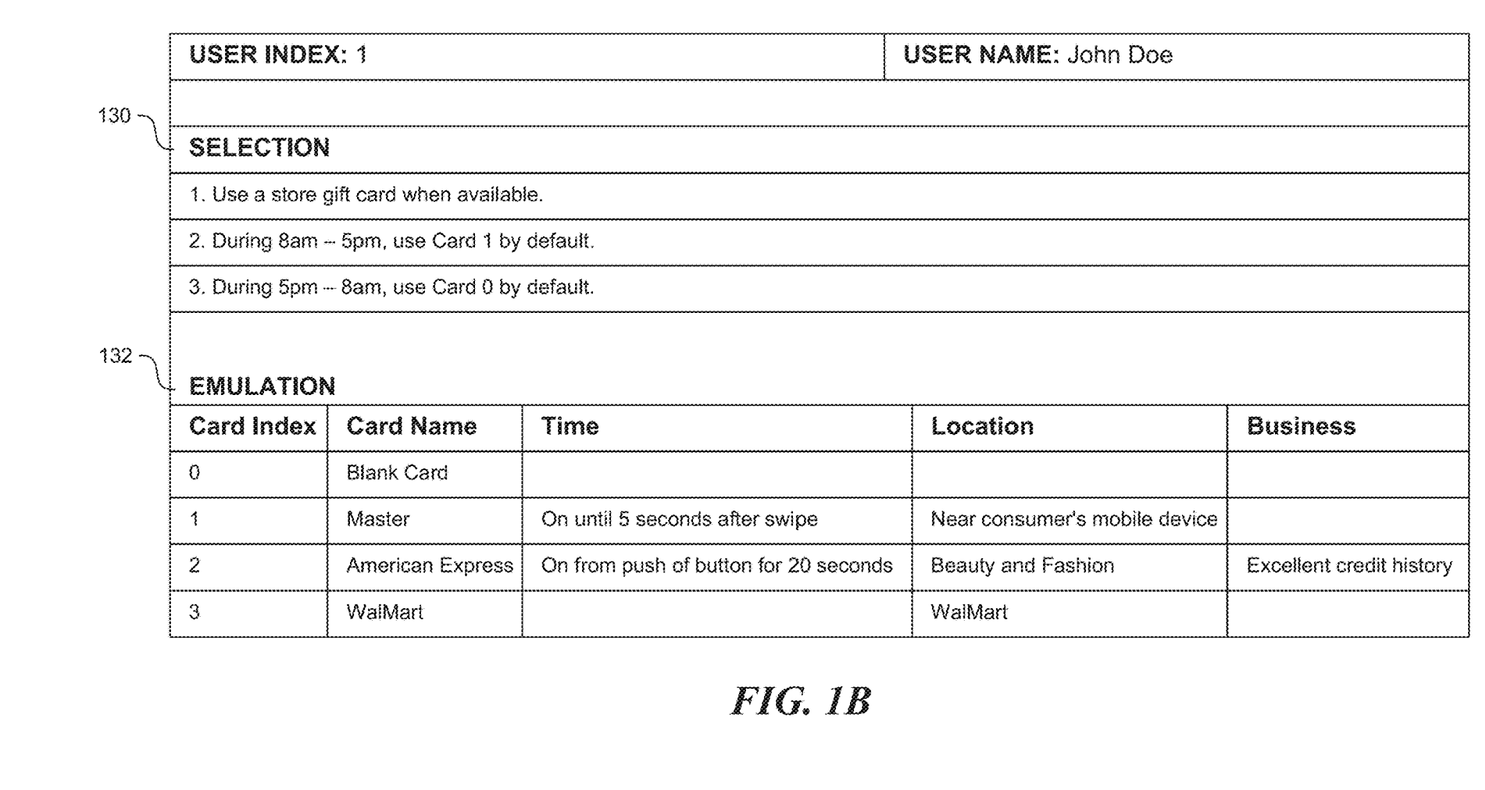
FIG. 1B illustrates an example proxy card profile.

In some embodiments, the server system 108 provides a client device with a graphical user interface (GUI) for the management of a proxy card profile. The GUI can be displayed on any of various client electronic devices, such as a mobile phone 104, a tablet, a laptop, or a desktop. The consumer can create, edit, or delete a proxy card profile on the server system 108. FIG. 1B illustrates an example proxy card profile. The proxy card profile includes two sections, a selection section 130 with rules for selecting one of the registered payment cards to emulate, and an emulation section 132 with rules for emulating each of the registered payment cards. The server system 108 can prepopulate the emulation section with information regarding each of the registered payment cards. The server system 108 can also add a "blank card" that corresponds to a state of no emulation to be distinguished from a real payment card. This blank card can be selected when no payment card is to be emulated by the proxy card.

In the selection section 130, each line corresponds to a selection rule. The selection rules specify how to select one or more payment cards out of a group of payment cards. The selection rules can be expressed in various forms, with regard to time, location, business, or other factors. Some examples are as follows: 1) selecting a particular payment card after normal business hours; 2) selecting a gift card from a particular merchant when the proxy card is located within a business establishment of the merchant; 3) selecting a payment card with a low foreign exchange rate when the proxy card 102 is located in a foreign country; 4) selecting a particular payment card when the proxy card is located at a business in a particular industry (e.g., entertainment, restaurant, etc.); 5) selecting a credit card instead of a debit card under a specified condition; 6) selecting a payment card in the consumer's name before selecting a payment card not in the consumer's name; 7) skipping a payment card that has been used more than a specified number of times or for transactions totaling more than a specified amount of money during a period of time.

In some embodiments, the selection rules can incorporate or be combined with Boolean operators. They can also be prioritized so that conflicts between them can be resolved. In some embodiments, while the selection rules enable an automatic selection of a payment card, they can be overridden by the consumer at the time of using the proxy card, as discussed below.

In the emulation section 132, each row corresponds to a set of emulation rules associated with a registered payment card, i.e., a payment card associated with the proxy card. These emulation rules control the emulation of a payment card, controlling how the payment card is emulated, for security, efficiency, and other purposes. The emulation rules can also be expressed in various forms, with regard to time, location, business, or other factors.

In some embodiments, regarding time, an emulation rule specifies that the emulation is on or off at a designated time or relative to the occurrence of an event, or the emulation lasts for a specified period of time, etc. Such an event can be, for example, the push of a button on the proxy card to signify the beginning of emulation, the accessing of the identification component on the proxy card, which normally signifies the end of emulation, the entering or exiting of a business location, the opening or closing of a business location, etc. Regarding location, an emulation rule specifies that the emulation is on or off at a designated location, near a particular object, etc. A designated location can be as specific as an address or the name of a business establishment or as broad as a category of businesses, such as a restaurant, or the name of a geographic area, such as New York City. An object in a scenario can be, for example, a mobile electronic device that also belongs to the consumer and communicates with the server system 108, such as a smart phone. The presence of such an object near the proxy card increases the possibility that the proxy card is in the possession of its rightful owner. Regarding business, an emulation rule specifies that the emulation is on or off depending on the nature of the business operating at the current location. Various aspects of the business can be taken into consideration, such as the size, the credit history, the customer service, etc.

In some embodiments, for each of the registered payment cards, multiple emulation rules can be combined. For example, a parent who controls the use of the proxy card by a child may create a first rule combination which indicates that a payment card is emulated for one hour from the time the button on the proxy card 102 is pushed when the business operating at the current location is a video game store, and a second rule combination which indicates that the payment card is emulated during the entire time the proxy card is on the premises of the business operating at the current location when the business is a bookstore. Furthermore, multiple emulation rules or combinations of emulation rules can be prioritized so that conflicts between them can be resolved.

In some embodiments, certain data regarding the registered payment cards, including the identification information and the proxy card profile, are transmitted from the server system 108 to the proxy card at various times. For example, the data regarding the registered payment cards can be transmitted to the proxy card 102 periodically or whenever a new payment card is registered and an existing payment card is un-registered. The proxy card profile similarly can be transmitted periodically or whenever a certain amount of update has been made to the proxy card profile. The transmission can result from a push from the server system 108 or a pull from the proxy card. Communication between the server system 108 and the proxy card can be through an electronic device that also belongs to the consumer and that communicates with the server system 108, such as the mobile phone 104. Specifically, the communication between the server system 108 and the mobile phone 104 can be through a cellular network and another network such as the Internet, for example, and the communication between the mobile phone 104 and the proxy card 102 can be through a short-range wireless link, which can be implemented by BLE.

Figure 1C:
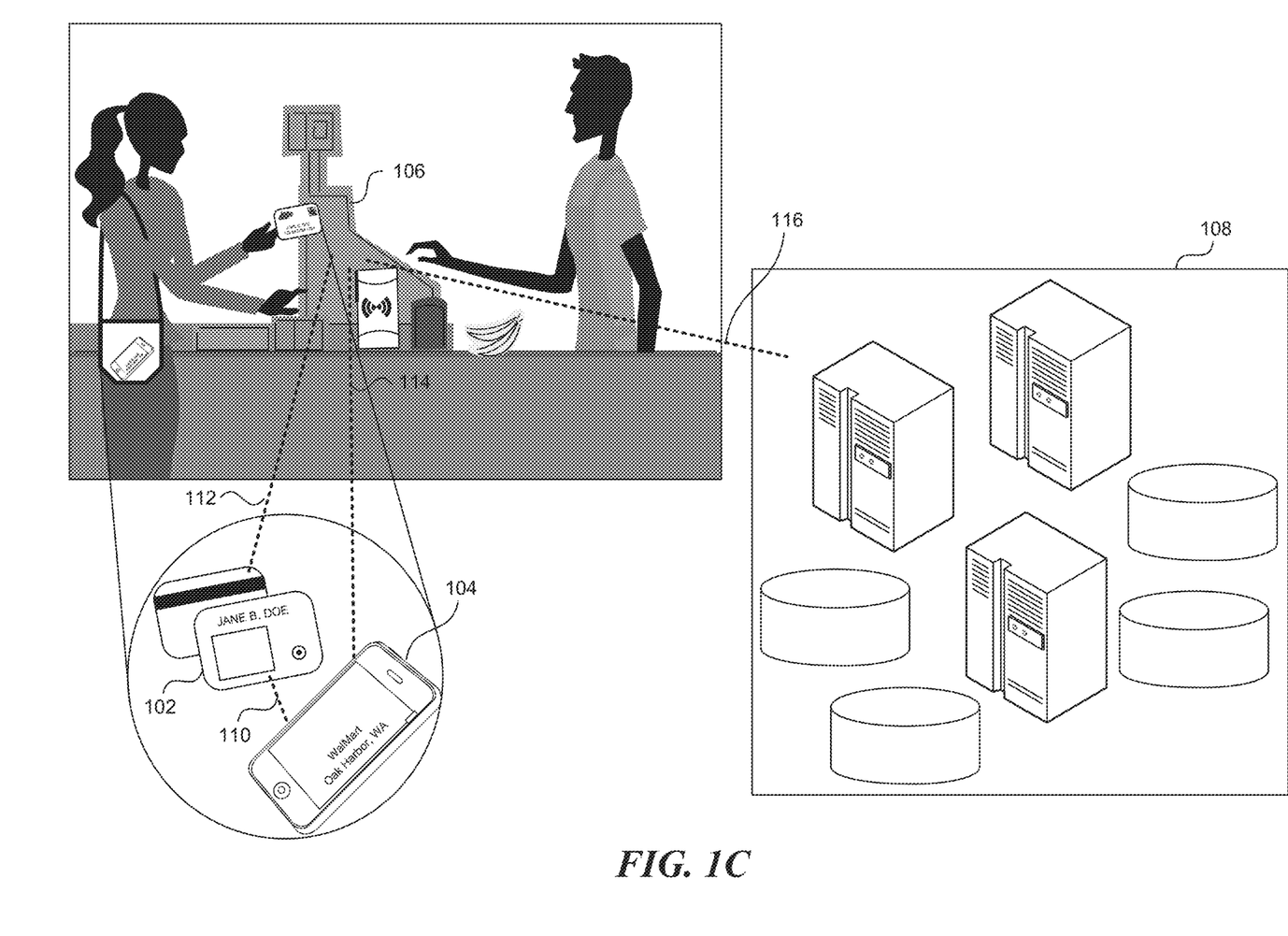
FIG. 1C illustrates an example environment in which a consumer uses a proxy card for payment at a point-of-sale (POS) system in a store.

FIG. 1C illustrates an example environment in which a consumer uses a proxy card for payment at a POS system in a store. In some embodiments, when the selection rules do not determine a payment card to emulate by default, the proxy card 102 displays a prompt for the consumer to select a payment card to emulate. The proxy card 102 allows the consumer to select a payment card using a button, a navigation key or other input element on the proxy card. A consumer can also make a selection using an electronic device, such as a mobile phone 104, which then communicates the selection to the proxy card 102. Once a payment card is selected for emulation, the associated emulation rules are applied.

In some embodiments, in applying the selection or emulation rules, the proxy card 102 determines whether a specific event has occurred, such as the push of a button on the proxy card 102 or the closing of a business location where the proxy card 102 is located. The proxy card 102 can detect the occurrence of an event or receive information from a nearby electronic device, such as the mobile phone 104, regarding the occurrence of an event through a short-range wireless link, such as BLE. As one example, the proxy card 102 can contain special hardware, such as an accelerometer, which detects the pressure exerted on or the speed of the proxy card 102, thereby determining whether the proxy card 102 is being swiped through a magnetic card reader. As another example, when the proxy card 102 is swiped through a magnetic card reader attached to the POS system 106, the information read from a magnetic stripe on the proxy card 102 can be transmitted from the POS system 106 through the server system 108 and the mobile phone 104 and back to the proxy card 102. The proxy card 102 also determines whether it is in a particular location or near a particular object. As one example, the proxy card 102 determines whether it is near a mobile phone of the consumer by requesting the mobile phone 104 to transmit its mobile phone number, where both the request and the response can be via a short-range wireless link, such as BLE. Next, the proxy card 102 determines whether the transmitted number matches the number for the mobile phone 104 previously stored on the proxy card 102. As another example, the proxy card 102 determines whether it is in a particular location by requesting the mobile phone 104, which has Global Positioning System (GPS) capabilities, to transmit information regarding its current location, using a short-range wireless link such as mentioned above. In addition, the proxy card 102 determines the nature of the business operating at the current location. The proxy card 102 can similarly rely on the mobile phone 104 to obtain such information directly, from a web search, for example, or by contacting the server system 108, which stores data regarding merchants and businesses. The proxy card 102 can also request a POS system 106 near the current location to transmit information regarding the business, such as a Merchant Category Code (MCC), using a short-range wireless link.

In some embodiments, as a result of applying the emulation rules, the proxy card 102 begins and ends the emulation of the selected payment card accordingly. It is possible that when the proxy card 102 is actually used, where the identification component is accessed by the POS system 106, for example, the emulation of the selected payment card is off according to the associated emulation rules. In that case, the proxy card 102 or the POS system 106 can display an error message. In response, the consumer may manually select another payment card, re-initiate an event, such as pushing a button on the proxy card 102, or take other actions to remedy the situation. The proxy card 102 can also automatically select the next payment card based on the selection rules.

In some embodiments, when the proxy card 102 is not emulating any payment card (e.g., because it is set to emulate the blank card, because the emulation is off for the selected payment card, or for some other reason), the proxy card 102 turns on a fraud protection feature. For example, the proxy card 102 displays an error message in an LCD on the proxy card 102 or sends an alert to the mobile phone 104 when the number of attempts to use the proxy card exceeds a predetermined threshold during a certain timeframe or duration.

Figure 2:
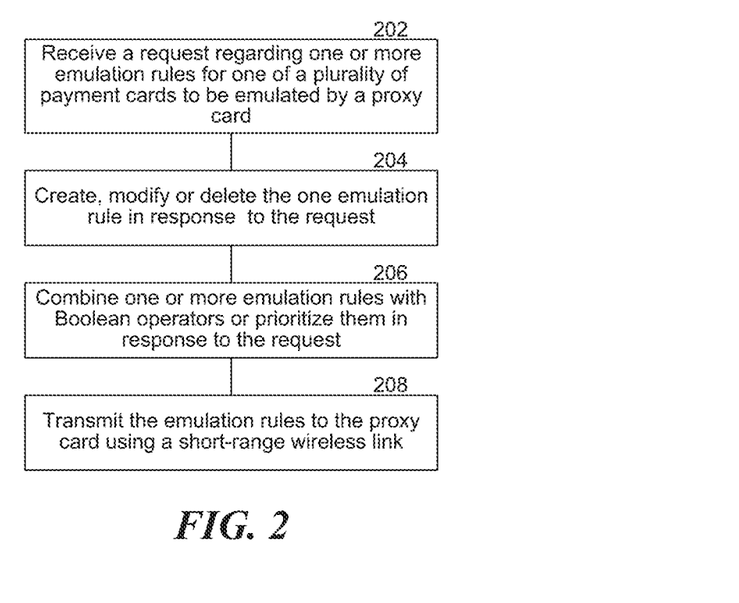
FIG. 2 is a flow diagram illustrating an example process performed by an electronic device for setting up a proxy card profile.

FIG. 2 is a flow diagram illustrating an example process performed by an electronic system for managing emulation rules that are part of a proxy card profile for a proxy card. The proxy card is used to emulate a group of payment cards, each being, for example, a credit card, a debit card, a gift card, an ATM card, a fleet card, etc. In step 202, an electronic system receives a request from a user of the electronic system, typically the owner of the proxy card, regarding one or more emulation rules associated with one of the group of payment cards. The electronic system can be or include, for example, a server system that stores all the emulation rules. It can also be or include a client electronic device, such as a mobile phone, tablet computer, laptop computer, or desktop computer, which supports a GUI for managing the emulation rules. In step 204, the electronic system creates, modifies, or deletes one or more emulation rules in response to the request. In working with an emulation rule, the electronic system allows the user to specify how emulation is performed with respect to time, location, business, and other factors. In step 206, the electronic system also combines or prioritizes multiple emulation rules in response to the request. It allows the user to specify which Boolean operators to use in combining emulation rules. It also allows the user to assign weights to individual emulation rules. In another example process, this step may be optional.

In step 208, the electronic system transmits existing emulation rules associated with the payment card to the proxy card. When the electronic system, such as the mobile phone that also belongs to the user, is near the proxy card, the electronic system can transmit the emulation rules directly using a short-range wireless link, such as BLE, Bluetooth, Wi-Fi, NFC or RFID. When the electronic system is not near the user, it can transmit the emulation rules to an electronic device that is near the user using a typical network interface and relies on that electronic device for further transmission to the proxy card. The transmission can be done based on a predetermined schedule, whenever emulation rules are updated, and so on. The emulation rules associated with the payment card may be transmitted by themselves or together with additional emulation rules.

Figure 3:
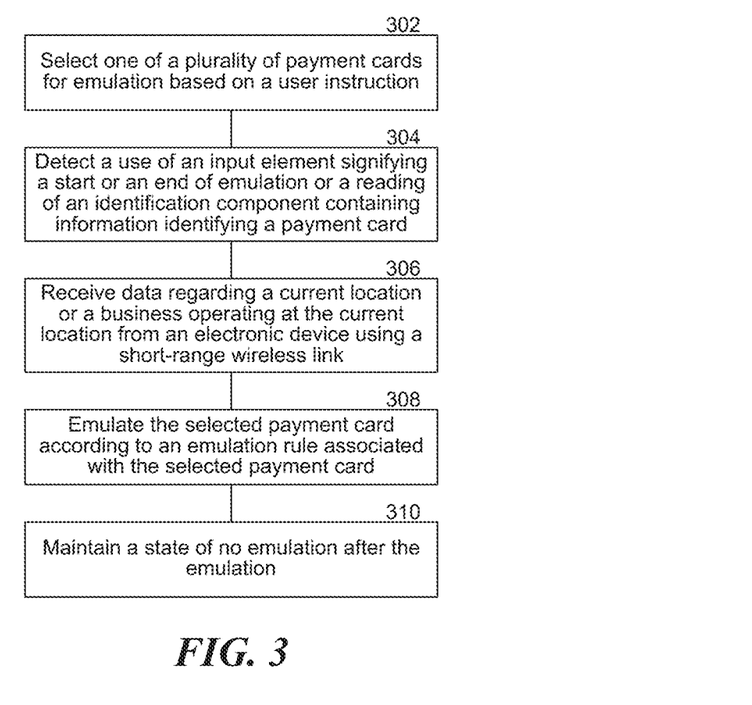
FIG. 3 is a flow diagram illustrating an example process performed by a proxy card for selecting and emulating one of a plurality of payment cards.

FIG. 3 is a flow diagram illustrating an example process performed by a proxy card for selecting and emulating one of a plurality of payment cards. The proxy card is used to emulate any of a group of payment cards, each being, for example, a credit card, a debit card, a gift card, an ATM card, a fleet card, etc. The proxy card contains an identification element, such as a magnetic stripe, or an IC chip (e.g., such as commonly used in a smartcard or in an RFID tag), which may hold information corresponding to a payment card. The proxy card also contains a communication element supporting short-range wireless communication. In addition, it may contain an input element, such as a button or a navigator key, and an output element, such as a display, for various purposes.

In step 302, the proxy card selects one card of the group of payment cards to emulate, based on an instruction from a user of the proxy card. The proxy card can preselect a payment card according to certain selection rules, but the user can manually select a card using the input element on the proxy card. Once a selection of a payment card is made, the proxy card needs to apply the emulation rules associated with the selected payment card. An emulation rule specifies how a payment card should be emulated with respect to time, location, business or other factors. Therefore, the proxy card identifies the current time, the current location, and the business operating at the current location in order to apply the emulation rules. In terms of time, in step 304, the proxy card detects any use of the input element for signifying a start or an end of emulation or any access of the identification component, which can correspond to an end of emulation. In terms of location and business, in step 306, the proxy card receives from a nearby electronic device, such as a mobile phone or a POS system of a store, data regarding the current location or the business operating at the current location using a short-range wireless link, such as BLE. Having identified the current time, the current location, and the business operating at the current location, in step 308, the proxy card applies the emulation rules associated with the selected payment card to determine how to emulate the selected payment card. Specifically, the proxy card configures the identification element to correspond to the selected payment card for a specific timeframe. Outside the timeframe, in step 310, the proxy card performs no emulation by keeping the identification element in a blank state that does not correspond to any payment card. This measure provides a high level of security. An alternative measure is for the proxy card to emulate a particular card by default.

Figure 4:
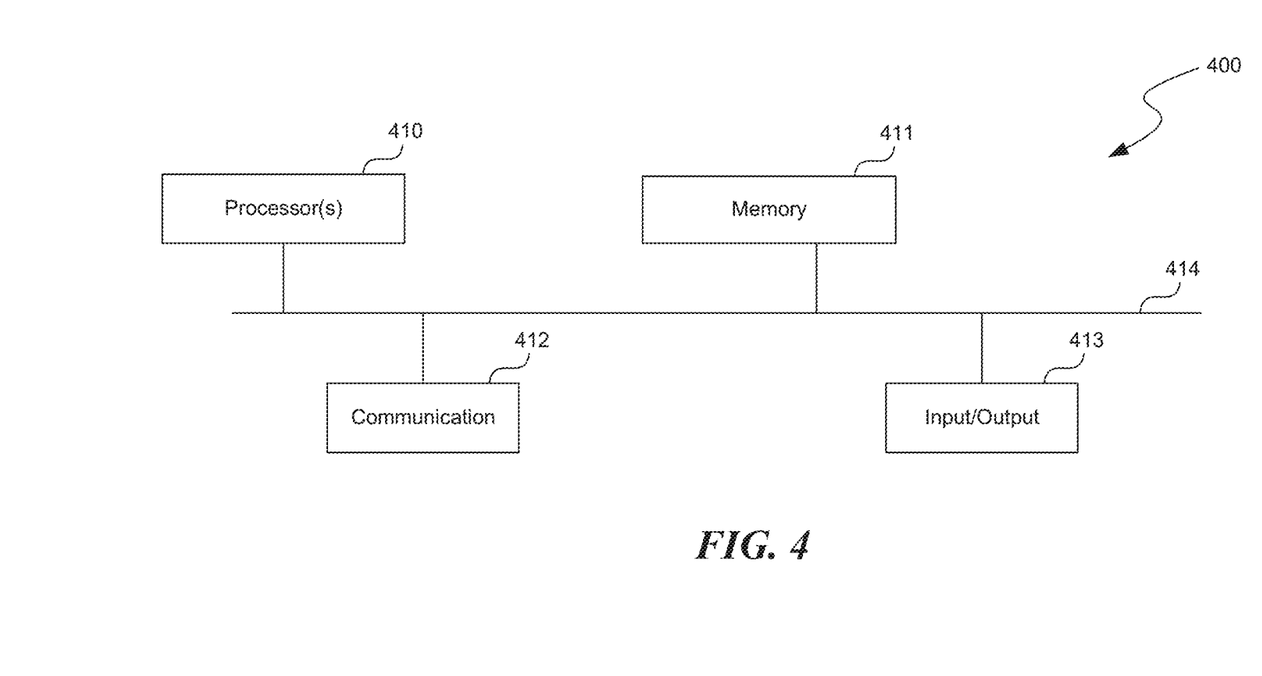
FIG. 4 is a high-level block diagram showing an example of a processing device that can implement techniques described herein.

FIG. 4 is a high-level block diagram showing an example of a processing device 400 that can represent any of the devices described above, such as a proxy card, an electronic device, and a server system. Any of these systems may include two or more processing devices such as represented in FIG. 4, which may be coupled to each other via a network or multiple networks.

In the illustrated embodiment, the processing system 400 includes one or more processors 410, memory 411, a communication device 412, and one or more input/output (I/O) devices 413, all coupled to each other through an interconnect 414. In some embodiments, the processing system 400 may not have any I/O devices 413. The interconnect 414 may be or include one or more conductive traces, buses, point-to-point connections, controllers, adapters and/or other conventional connection devices. The processor(s) 410 may be or include, for example, one or more general-purpose programmable microprocessors, microcontrollers, application specific integrated circuits (ASICs), programmable gate arrays, or the like, or a combination of such devices. The processor(s) 410 control the overall operation of the processing device 400. Memory 411 may be or include one or more physical storage devices, which may be in the form of random access memory (RAM), read-only memory (ROM) (which may be erasable and programmable), non-volatile memory such as flash memory, miniature hard disk drive, or other suitable type of storage device, or a combination of such devices. Memory 411 may store data and instructions that configure the processor(s) 410 to execute operations in accordance with the techniques described above. The communication device 412 may be or include, for example, an Ethernet adapter, cable modem, Wi-Fi adapter, cellular transceiver, Bluetooth transceiver, or the like, or a combination thereof. For an electronic sensing device of a merchant, or a proxy card or mobile device of a consumer, the communication device 412 supports at least one technology for short-range wireless communication. Depending on the specific nature and purpose of the processing device 400, the I/O devices 413 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described but can be practiced with modification and alteration within the spirit and scope of the appended claims. Accordingly, the specification and drawings are to be regarded in an illustrative sense rather than a restrictive sense.

The invention claimed is:

1. A method comprising:
   receiving, by an electronic system, a request regarding an emulation rule of a plurality of emulation rules for one of a plurality of payment cards to be emulated by a card that is external to the electronic system;
   creating or modifying, by the electronic system, the emulation rule in response to the request; and
   transmitting, to the card, the created or modified emulation rule when an update has been made to the plurality of emulation rules,
   wherein the created or modified emulation rule is applied to the card in response to a trigger event,
   wherein application of different emulation rules, corresponding to the plurality of payment cards, to the card facilitates a user of the card with benefits from use of the plurality of payment cards with a single card, and
   wherein the card has an appearance of a payment card and contains a processing element and memory.

2. The method of claim 1, further comprising:
   receiving a second request regarding the plurality of emulation rules for one of the plurality of payment cards; and
   combining the plurality of emulation rules by Boolean operators in response to the second request.

3. The method of claim 1, further comprising:
   receiving a second request regarding the plurality of emulation rules for one of the plurality of payment cards; and
   prioritizing the plurality of emulation rules in response to the second request.

4. The method of claim 1, further comprising receiving a second request regarding a selection rule for selecting one of the plurality of payment cards for emulation.

5. The method of claim 4, wherein the selection rule involves a time, a location, or a business.

6. The method of claim 4, further comprising creating, modifying, or deleting the selection rule in response to the second request.

7. The method of claim 4, further comprising:
   receiving a third request regarding a plurality of selection rules for one of the plurality of payment cards; and
   combining the plurality of selection rules or prioritizing the plurality of selection rules in response to the third request.

* * * * *